United States Patent
Karlsson et al.

(10) Patent No.: US 8,679,658 B2
(45) Date of Patent: Mar. 25, 2014

(54) METHODS AND SYSTEMS FOR CONDITIONING ENERGY STORAGE SYSTEMS OF VEHICLES

(75) Inventors: Rolf B. Karlsson, Grand Blanc, MI (US); George M. Claypole, Fenton, MI (US); Michael J. Kutcher, Wixom, MI (US); Richard A. Marsh, Beverly Hills, MI (US); Keith R. Kabel, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1126 days.

(21) Appl. No.: 12/472,063

(22) Filed: May 26, 2009

(65) Prior Publication Data

US 2010/0304193 A1    Dec. 2, 2010

(51) Int. Cl.
*H01M 10/44* (2006.01)
*H01M 10/50* (2006.01)

(52) U.S. Cl.
USPC ................................ 429/50; 429/120

(58) Field of Classification Search
USPC .................................................. 429/50, 120
See application file for complete search history.

(56) References Cited

U.S. PATENT DOCUMENTS

| | | | |
|---|---|---|---|
| 2006/0036883 A1* | 2/2006 | Hashizumi et al. | 713/300 |
| 2006/0060236 A1* | 3/2006 | Kim | 136/203 |
| 2008/0276632 A1* | 11/2008 | Kumar | 62/118 |
| 2009/0182489 A1* | 7/2009 | Yang et al. | 701/113 |

* cited by examiner

*Primary Examiner* — Karie O'Neill Apicella
(74) *Attorney, Agent, or Firm* — Ingrassia Fisher & Lorenz, P.C.

(57) ABSTRACT

A method for conditioning an energy storage system for a vehicle located in a geographic area includes the steps of obtaining data pertaining to an external temperature of the geographic area, measuring a temperature of the energy storage system, heating the energy storage system if the temperature is less than a first predetermined threshold, and cooling the energy storage system if the temperature is greater than a second predetermined threshold. The first predetermined threshold is dependent upon the external temperature. The second predetermined threshold is also dependent upon the external temperature.

17 Claims, 3 Drawing Sheets

METHODS AND SYSTEMS FOR CONDITIONING ENERGY STORAGE SYSTEMS OF VEHICLES

TECHNICAL FIELD

The present invention generally relates to the field of vehicles and, more specifically, to methods and systems for conditioning energy storage systems of vehicles.

BACKGROUND OF THE INVENTION

Today's electric vehicles and hybrid electric vehicles typically include an energy storage system (ESS), such as a battery pack. The energy storage system may be charged with electrical power while the vehicle is not operating in a driving mode, and then subsequently supplies power for operation of the vehicle during the driving mode. However, energy storage systems can be affected by temperature conditions of the surrounding geographic area. For example, when an energy storage system is soaked in extreme cold temperatures while the vehicle is in a park mode, the power limits of the energy storage system may be reduced. In addition, when an energy storage system is soaked in extreme hot temperatures while the vehicle is in a park mode, calendar aging of the energy storage system may be accelerated.

Accordingly, it is desirable to provide an improved method for conditioning energy storage systems of vehicles, for example that helps alleviate reductions in ESS power limits when the energy storage system is exposed to extreme cold temperatures or climates and/or that helps alleviate the acceleration of calendar aging of the energy storage system when the energy storage system is exposed to extreme hot temperatures and/or climates. It is also desirable to provide an improved program product for such conditioning of energy storage systems of vehicles. It is further desirable to provide an improved system for such conditioning of energy storage systems of vehicles. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method for conditioning an energy storage system for a vehicle located in a geographic area is provided. The method comprises the steps of obtaining data pertaining to an external temperature of the geographic area, measuring a temperature of the energy storage system, heating the energy storage system if the temperature is less than a first predetermined threshold, and cooling the energy storage system if the temperature is greater than a second predetermined threshold. The first predetermined threshold is dependent upon the external temperature. The second predetermined threshold is also dependent upon the external temperature.

In accordance with another exemplary embodiment of the present invention, a system for conditioning an energy storage system (ESS) for a vehicle located in a geographic area is provided. The system comprises an external temperature data unit, an ESS condition unit, and a controller. The external temperature data unit is configured to obtain data related to an external temperature of the geographic area. The ESS condition unit is configured to obtain a value related to a temperature of the energy storage system. The controller is coupled to the external temperature data unit and the ESS condition unit, and is configured to facilitate heating of the energy storage system if the temperature is less than a first predetermined threshold and facilitate cooling of the energy storage system if the temperature is greater than a second predetermined threshold. The first predetermined threshold is dependent upon the external temperature. The second predetermined threshold is also dependent upon the external temperature.

In accordance with a further exemplary embodiment of the present invention, a system for conditioning an energy storage system (ESS) for a vehicle located in a geographic area is provided. The system comprises a first sensor, a second sensor, and a processor. The first sensor is configured to generate outside air temperature signals related to an outside air temperature for the geographic area. The second sensor is configured to generate ESS temperature signals related to an ESS temperature. The processor is coupled to the first and second sensors, and is configured to facilitate heating of the energy storage system if the ESS temperature is less than a first predetermined threshold and facilitate cooling of the energy storage system, if the ESS temperature is greater than a second predetermined threshold. The first predetermined threshold is dependent upon the outside air temperature. The second predetermined threshold is dependent upon the outside air temperature.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
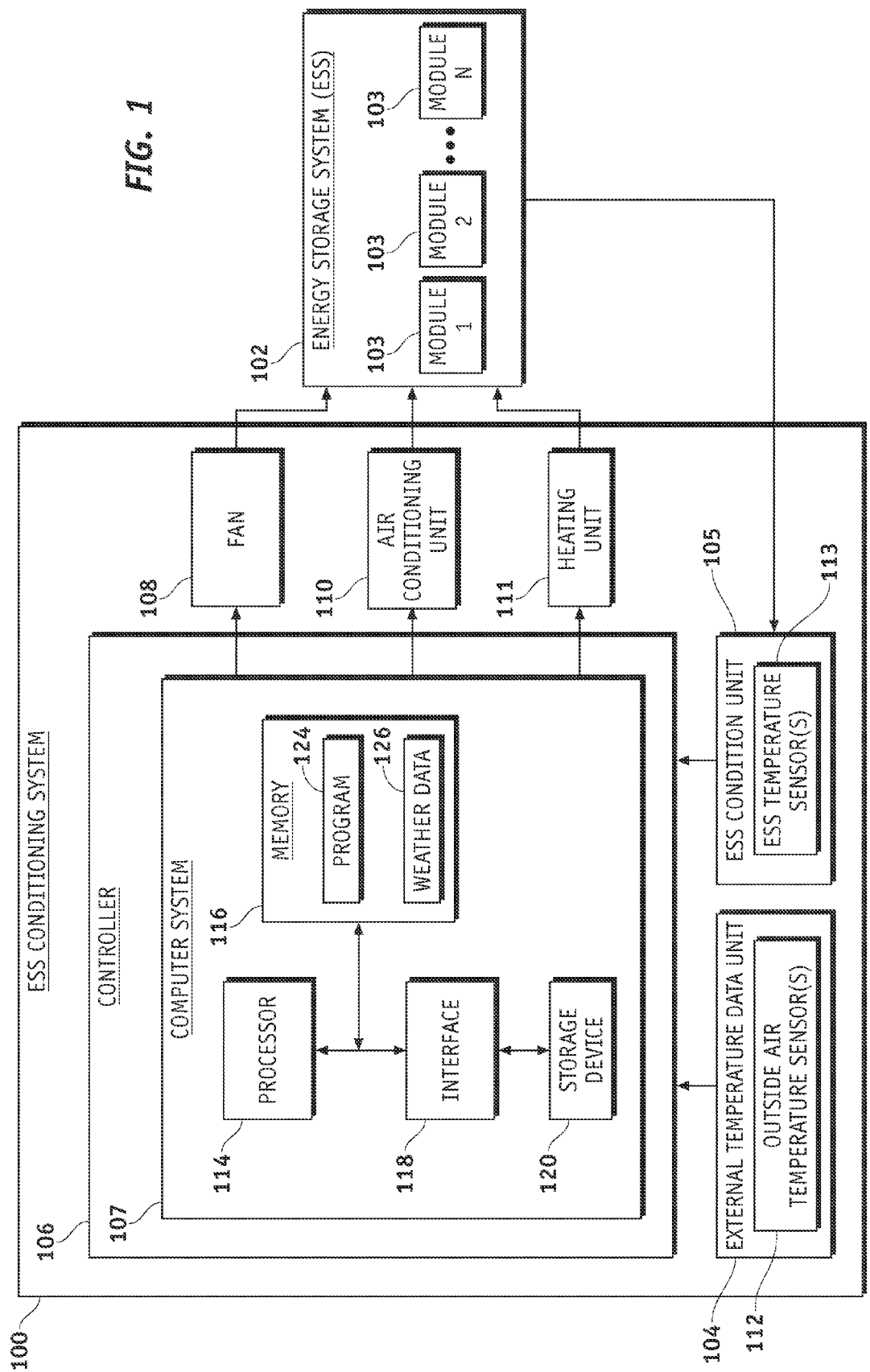
FIG. 1 is a functional block diagram of a system for use in conditioning an energy storage system of a vehicle, in accordance with an exemplary embodiment of the present invention.

FIG. 1 is a block diagram of an exemplary energy storage system (ESS) conditioning system 100 for an energy storage system 102 of a vehicle, and depicted alongside such an energy storage system 102, in accordance with an exemplary embodiment of the present invention. In the depicted embodiment, the energy storage system 102 includes a plurality of modules 103. In a preferred embodiment, the energy storage system 102 comprises a battery pack for an electric vehicle, and the modules 103 comprise any number of modules 103 of the battery pack. In another preferred embodiment, the energy storage system 102 comprises a battery pack for a hybrid electric vehicle, and the modules 103 comprise any number of modules 103 of the battery pack.

In the depicted embodiment, the ESS conditioning system 100 includes an external temperature data unit 104, an ESS condition unit 105, and a controller 106. In the depicted embodiment, the ESS conditioning system 100 also includes a fan 108, an air conditioning unit 110, and a heating unit 111. However, this may vary in other embodiments. For example, in certain other embodiments, the ESS conditioning system 100 may instead be coupled to the fan 108, the air conditioning unit 110, and/or the heating unit 111. In yet other embodiments, the ESS conditioning system 100 may include and/or be coupled to any number of other different types of heating and/or cooling devices, instead of or in addition to the fan 108, the air conditioning unit 110, and/or the heating unit 111 of FIG. 1.

The external temperature data unit 104 is configured to obtain data representative of an external temperature of the geographic area. Specifically, in accordance with a preferred embodiment of the invention, the external temperature data unit 104 measures outside air temperature values of the geographic area outside the vehicle during ignition cycles of the vehicle, in accordance with the process 200 depicted in FIGS. 2 and 3 and described in greater detail further below in connection therewith. Also in a preferred embodiment, the external temperature data unit 104 includes one or more outside air temperature sensors 112 that measure the outside air temperature of the geographic area outside the vehicle during the ignition cycles and provide signals representative thereof to the controller 106 for processing and for use in conditioning the energy storage system 102.

The ESS condition unit 105 is configured to obtain a value representative of a temperature of the energy storage system. Specifically, in accordance with a preferred embodiment of the invention, the ESS condition unit 105 measures module temperatures of the various modules 103 of the energy storage system 102, in accordance with the process 200 depicted in FIGS. 2 and 3 and described in greater detail further below in connection therewith. Also in a preferred embodiment, the ESS condition unit 105 includes one or more ESS temperature sensors 113 that measure the module temperatures and provide signals representative thereof to the controller 106 for processing and for use in conditioning the energy storage system 102.

The controller 106 is coupled to the external temperature data unit 104 and the ESS condition unit 105. In a preferred embodiment, the controller 106 is also coupled to the fan 108, the air conditioning unit 110, and the heating unit 111, and thereby to the energy storage system 102, as depicted in FIG. 1. The controller 106 receives inputs and data from the external temperature data unit 104 and the ESS condition unit 105, preferably from the one or more outside air temperature sensors 112 and ESS temperature sensors 113, respectively, thereof. As described in more detail below, the controller 106 uses values from these inputs and data in conditioning the energy storage system 102 using the fan 108, the air conditioning unit 110, and/or the heating unit 111, in accordance with the process 200 of FIGS. 2 and 3 as set forth in greater detail further below.

In the depicted embodiment, the controller 106 includes a computer system 107 that includes a processor 114, a memory 116, an interface 118, a storage device 120, and a bus 122. The processor 114 performs the computation and control functions of the controller 106, and may comprise any type of processor or multiple processors, single integrated circuits such as a microprocessor, or any suitable number of integrated circuit devices and/or circuit boards working in cooperation to accomplish the functions of a processing unit. During operation, the processor 114 executes one or more programs 124 contained within the memory 116 and, as such, controls the general operation of the computer system 107.

The memory 116 can be any type of suitable memory. This would include the various types of dynamic random access memory (DRAM) such as SDRAM, the various types of static RAM (SRAM), and the various types of non-volatile memory (PROM, EPROM, and flash). Also as depicted in FIG. 1, the memory 116 preferably stores the program 124 as well as weather data 126 (preferably, outside air temperature values of the geographic area) from recent ignition cycles used for conditioning the energy storage system 102 as set forth in greater detail further below in connection with the process 200 of FIGS. 2 and 3. The bus 122 serves to transmit programs, data, status and other information or signals between the various components of the computer system 107.

The interface 118 allows communication to the computer system 107, for example from a system driver and/or another computer system, and can be implemented using any suitable method and apparatus. It can include one or more network interfaces to communicate with other systems or components. The interface 118 may also include one or more network interfaces to communicate with technicians, and/or one or more storage interfaces to connect to storage apparatuses, such as the storage device 120.

The storage device 120 can be any suitable type of storage apparatus, including direct access storage devices such as hard disk drives, flash systems, floppy disk drives and optical disk drives. In one exemplary embodiment, the storage device 120 comprises a program product from which memory 116 can receive a program 124 that executes one or more embodiments of one or more processes of the present invention, such as the process 200 of FIGS. 2 and 3 or portions thereof. In another exemplary embodiment, the program product may be directly stored in and/or otherwise accessed by the memory 116 and/or a disk such as that referenced below.

The bus 122 can be any suitable physical or logical means of connecting computer systems and components. This includes, but is not limited to, direct hard-wired connections, fiber optics, infrared and wireless bus technologies. During operation, the program 124 is stored in the memory 116 and executed by the processor 114. It will be appreciated that the controller 106 may differ from the embodiment depicted in FIG. 1, for example in that the controller 106 may be coupled to or may otherwise utilize one or more remote computer systems and/or other control systems.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system 107 may also otherwise differ from the embodiment depicted in FIG. 1, for example in that the computer system 107 may be coupled to or may otherwise utilize one or more remote computer systems and/or other control systems.

Figure 2:
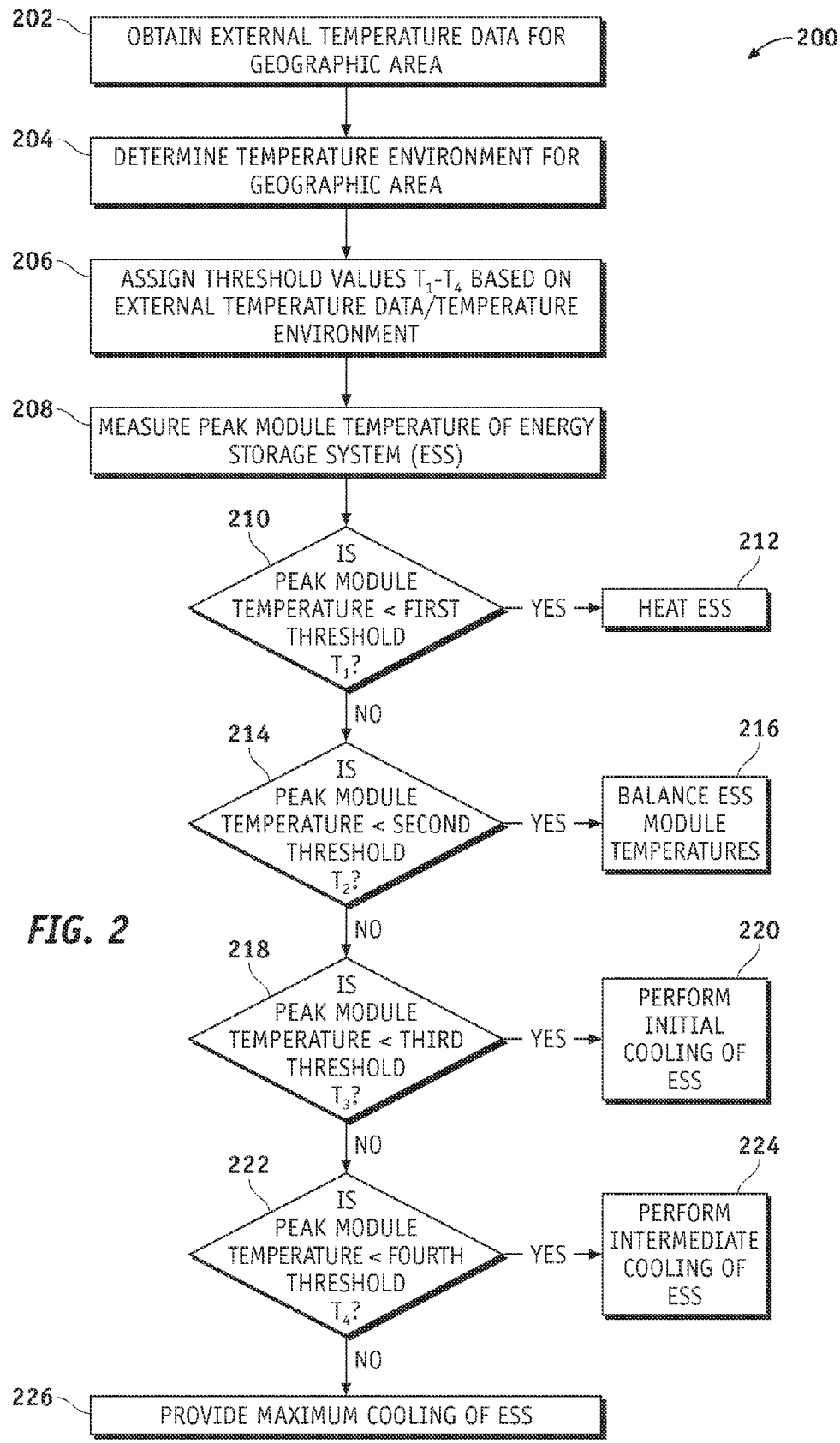
FIG. 2 is a flowchart of a process for conditioning an energy storage system for a vehicle, and that can be used in connection with the system of FIG. 1, in accordance with an exemplary embodiment of the present invention.

FIG. 2 is a flowchart of a process 200 for conditioning an energy storage system of a vehicle located in a geographic area, in accordance with an exemplary embodiment of the present invention. The process 200 can be implemented in connection with the ESS conditioning system 100 and the energy storage system 102 of FIG. 1 and/or the computer system 107 of FIG. 1 and/or program products utilized therewith, in accordance with an exemplary embodiment of the present invention.

As depicted in FIG. 2, the process 200 begins with the step of obtaining external temperature data for the geographic area in which the vehicle is located (step 202). In a preferred embodiment, the external temperature data comprises values of an outside air temperature of the geographic area outside the vehicle over a plurality of ignition cycles during operation of the vehicle. Also in a preferred embodiment, the external temperature data is obtained by the external temperature data unit 104 of FIG. 1, preferably by one or more outside air temperature sensors 112 thereof, which generate signals based thereon and provide them to the computer system 107 of FIG. 1.

In addition, a temperature environment for the geographic area is determined (step 204). An exemplary flowchart of one embodiment of step 204, determining the temperature environment of the geographic area outside of the vehicle, is provided in FIG. 3 and will be described below in connection therewith, in connection with one exemplary embodiment of the present invention.

Figure 3:
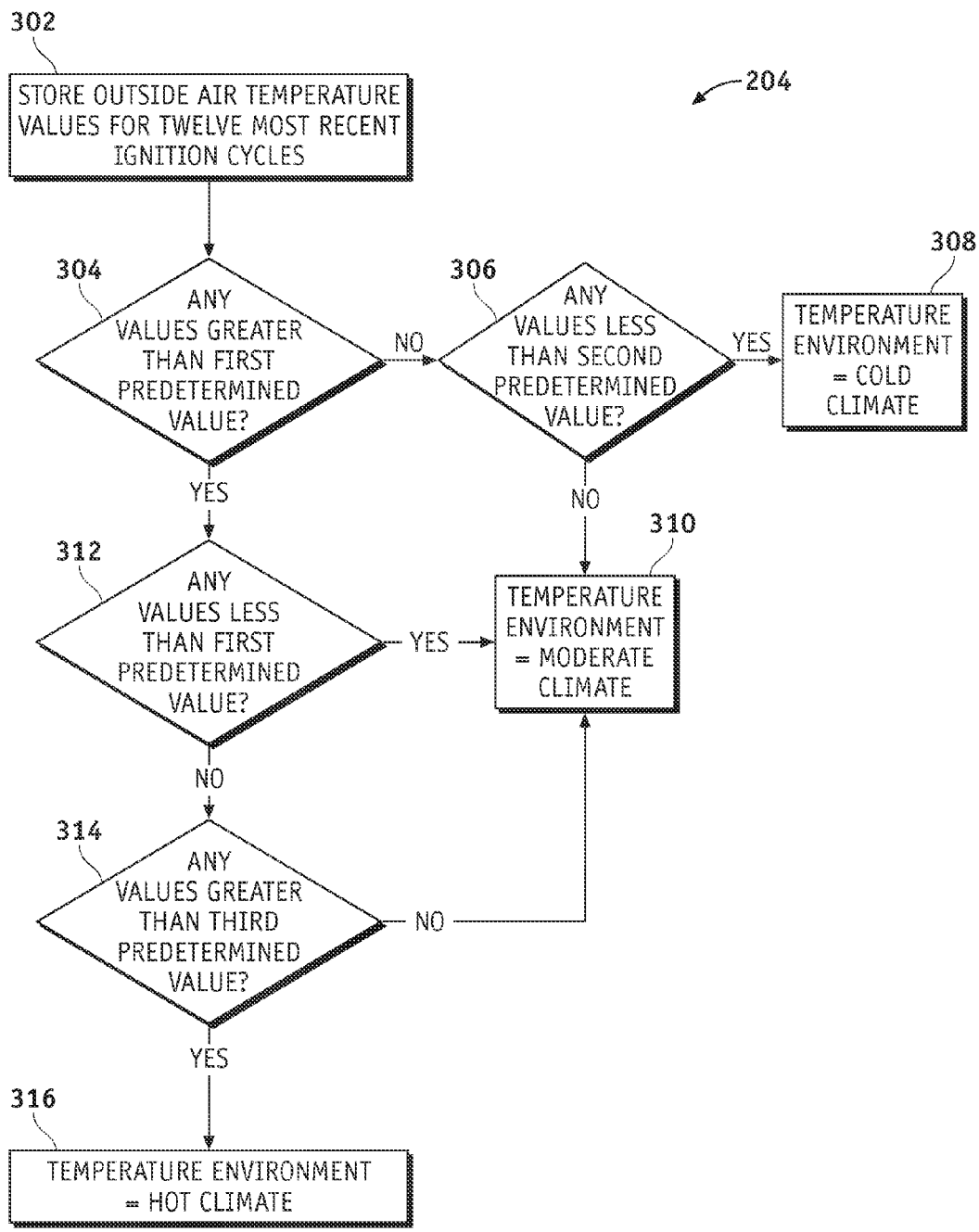
FIG. 3 is a flowchart of a step of the process of FIG. 2, namely the step of identifying an external temperature environment of a geographic area in which the energy storage system is located, in accordance with an exemplary embodiment of the present invention.

As depicted in FIG. 3, in one exemplary embodiment, step 204 begins with the step of storing outside air temperature values for twelve ignition cycles (step 302). It will be appreciated that the number of ignition cycles may vary in other embodiments. In a preferred embodiment, the outside air temperature values are stored in the memory 116 of the computer system 107 of FIG. 1 as the weather data 126 of FIG. 1 for subsequent use by the processor 114 of FIG. 1, as described below.

A determination is then made as to whether any of the outside air temperature values stored in step 302 are greater than a first predetermined temperature value (step 304). In one preferred embodiment, the first predetermined temperature value is equal to fifteen degrees Celsius. However, this may vary in other embodiments. In a preferred embodiment, this determination is made by the processor 114 of the computer system 107 of FIG. 1.

If it is determined in step 304 that none of the outside air temperature values are greater than the first predetermined temperature value, then a determination is made as to whether any of the outside air temperature values stored in step 302 are less than a second predetermined temperature value (step 306). The second predetermined temperature value is preferably less than the first predetermined temperature value. In one preferred embodiment, the second predetermined temperature value is equal to five degrees Celsius. However, this may vary in other embodiments. In a preferred embodiment, this determination is made by the processor 114 of the computer system 107 of FIG. 1.

If a determination is made in step 306 that at least one of the outside air temperature values are less than the second predetermined temperature value, then a determination is made that the temperature environment for the geographic area outside the vehicle is a cold climate (step 308). Conversely, if it is determined in step 306 that none of the outside air temperature values are less than the second predetermined temperature value, then a determination is made that the temperature environment for the geographic area outside the vehicle is a moderate climate (step 310).

Returning now to step 304, if it is determined in step 304 that one or more of the outside air temperature values are greater than the first predetermined temperature value, then a determination is made as to whether any of the outside air temperature values stored in step 302 are less than the first predetermined temperature value (step 312). In a preferred embodiment, this determination is made by the processor 114 of the computer system 107 of FIG. 1. If a determination is made in step 312 that at least one of the outside air temperature values is less than the first predetermined temperature value, then a determination is made that the temperature environment for the geographic area outside the vehicle is a moderate climate (step 310).

Conversely, if it is determined in step 312 that none of the outside air temperature values are less than the first predetermined temperature value, then a determination is made as to whether any of the outside air temperature values stored in step 302 are greater than a third predetermined temperature value (step 314). The third predetermined temperature value is preferably greater than the first predetermined temperature value and greater than the second predetermined temperature value. In one preferred embodiment, the third predetermined temperature value is equal to twenty-five degrees Celsius. However, this may vary in other embodiments. In a preferred embodiment, this determination is made by the processor 114 of the computer system 107 of FIG. 1.

If a determination is made in step 314 that at least one of the outside air temperature values are greater than the third predetermined temperature value, then a determination is made that the temperature environment for the geographic area outside the vehicle is a hot climate (step 316). Conversely, if it is determined in step 314 that none of the outside air temperature values are greater than the third predetermined temperature value, then a determination is made that the temperature environment for the geographic area outside the vehicle is a moderate climate (step 310).

Returning now to FIG. 2, the process 200 continues with the step of assigning various threshold values T1-T4 based on the external temperature (step 206). The threshold values T1-T4 will subsequently be utilized in determinations as to whether and/or how the energy storage system will be heated or cooled, as set forth in greater detail below, in accordance with a preferred embodiment of the present invention. In a preferred embodiment, the threshold values T1-T4 are assigned based on the type of temperature environment of the geographic area as determined in step 204. Specifically, in accordance with one exemplary embodiment, a first set of threshold values T1-T4 are assigned if the temperature environment of the geographic area is determined in step 204 to be a cold climate; a second set of threshold values T1-T4 are assigned if the temperature environment of the geographic area is determined in step 204 to be a moderate climate; and a third set of threshold values T1-T4 are assigned if the temperature environment of the geographic area is determined in step 204 to be a hot climate. Also in a preferred embodiment, the assignment of the threshold values T1-T4 is made by the processor 114 of the computer system 107 of FIG. 1.

In addition, an ESS temperature is measured (step 208). In a preferred embodiment, the ESS temperature comprises a peak module temperature of various modules 103 of the energy storage system 102 of FIG. 1 during operation of the vehicle. Also in a preferred embodiment, the ESS temperature is measured by the ESS condition unit 105 of FIG. 1, preferably by one or more ESS temperature sensors 113 thereof, which generate signals based thereon and provide them to the computer system 107 of FIG. 1. Multiple ESS temperatures, averaged ESS temperatures, and/or other ESS temperatures may also be obtained and utilized throughout in certain embodiments.

A determination is then made as to whether the ESS temperature is less than a first threshold value T1 (step 210). In a preferred embodiment, the first threshold value T1 is dependent on the external temperature of the geographic area as determined in step 202. Specifically, in one preferred embodiment, the first threshold value T1 is dependent on the temperature environment of the geographic area as determined in step 204. For example, in one preferred embodiment, the first threshold value T1 is equal to 20 degrees Celsius if the temperature environment of the geographic area is determined to be a cold climate; 10 degrees Celsius if the temperature environment of the geographic area is determined to be a moderate climate; and 10 degrees Celsius if the temperature environment of the geographic area is determined to be a hot climate. However, these values, and/or the methods of assigning the first threshold value T1, may vary in other embodiments.

If it is determined in step 210 that the ESS temperature is less than the first threshold value T1, then the energy storage system is heated (step 212). In one preferred embodiment, the heating of the energy storage system 102 of FIG. 1 is facilitated by the processor 114 of the controller 106 of FIG. 1 by providing instructions to and operating the heating unit 111 of FIG. 1. Also in a preferred embodiment, if the energy storage system is propulsion ready, an ESS valve is set to bypass, and the heating unit operates at a predetermined percentage capacity (for example, seventy five percent, although this may vary) until the ESS temperature reaches the first threshold value T1. However, this may vary in other embodiments. In addition, in one preferred embodiment, the fan may be used in conjunction with or instead of the heating unit if the ESS temperature is at least two degrees Celsius below an air temperature measured at the fan (which, in certain embodiments, comprises a cabin temperature of the vehicle). However, this may also vary in other embodiments. Also in a preferred embodiment, if the energy storage system is plugged in to charge, then the valve is set to bypass, and the heating unit operates at a varying capacity from one hundred percent capacity to zero percent capacity as the ESS temperature approaches a predetermined target temperature, and the energy storage system is not charged during this time. However, this may also vary in other embodiments.

Conversely, if it is determined in step 210 that the ESS temperature is greater than or equal to the first threshold value T1, then a determination is made as to whether the ESS temperature is less than a second threshold value T2 (step 214). In a preferred embodiment, the second threshold value T2 is dependent on the external temperature of the geographic area as determined in step 202. Specifically, in one preferred embodiment, the second threshold value T2 is dependent on the temperature environment of the geographic area as determined in step 204. For example, in one preferred embodiment, the second threshold value T2 is equal to 28 degrees Celsius if the temperature environment of the geographic area is determined to be a cold climate; 25 degrees Celsius if the temperature environment of the geographic area is determined to be a moderate climate; and 15 degrees Celsius if the temperature environment of the geographic area is determined to be a hot climate. However, these values, and/or the methods of assigning the second threshold value T2, may vary in other embodiments. In addition, in one preferred embodiment, the second threshold value T2 of step 214 is greater than the first threshold value T1 of step 212 for any particular set of threshold values T1-T4, in other words, for any particular temperature environment for the geographic area surrounding the vehicle.

If it is determined in step 214 that the ESS temperature is less than the second threshold value T2, then the module temperatures of the energy storage system are balanced (step 216). In one preferred embodiment, various module temperatures from the modules 103 of the energy storage system 102 of FIG. 1 are balanced by the processor 114 of the controller 106 of FIG. 1 by providing instructions to circulate the ESS temperature conditioning medium (liquid, air, or other) without actively heating or cooling the medium.

Conversely, if it is determined in step 214 that the ESS temperature is greater than or equal to the second threshold value T2, then a determination is made as to whether the ESS temperature is less than a third threshold value T3 (step 218). In a preferred embodiment, the third threshold value T3 is dependent on the external temperature of the geographic area as determined in step 202. Specifically, in one preferred embodiment, the third threshold value T3 is dependent on the temperature environment of the geographic area as determined in step 204. For example, in one preferred embodiment, the third threshold value T3 is equal to 35 degrees Celsius if the temperature environment of the geographic area is determined to be a cold climate; 32 degrees Celsius if the temperature environment of the geographic area is determined to be a moderate climate; and 25 degrees Celsius if the temperature environment of the geographic area is determined to be a hot climate. However, these values, and/or the methods of assigning the third threshold value T3, may vary in other embodiments. In addition, in one preferred embodiment, the third threshold value T3 of step 218 is greater than the second threshold value T2 of step 214 and the first threshold value T1 of step 212 for any particular set of threshold values T1-T4, in other words, for any particular temperature environment for the geographic area surrounding the vehicle.

If it is determined in step 218 that the ESS temperature is less than the third threshold value T3, then an initial cooling of the energy storage system is performed (step 220). In one preferred embodiment, the initial cooling of the energy storage system 102 of FIG. 1 is facilitated by the processor 114 of the controller 106 of FIG. 1 by providing instructions to and operating the fan 108 of FIG. 1. Also in one preferred embodiment, if the energy storage system is propulsion ready, the fan 108 operates at a variable capacity. However, because this may involve noise making considerations, in one preferred embodiment the operation of the fan effect initial cooling is only enabled if the air temperature measured at the fan is at least two degrees Celsius less than the ESS peak temperature. However, this may vary in other embodiments. Also in a preferred embodiment, if the energy storage system is plugged in to charge, then the fan 108 operates at a reduced capacity (for example, fifty percent of capacity, although this may vary), and the energy storage system is charged with a rate corresponding to a target state of charge dependent upon the temperature at this time. In one preferred embodiment, the controller 106 monitors the air temperature at the fan and delays initial cooling using the fan during plug-in charging by a predetermined number of hours in order to improve the initial cooling through the use of reduced air temperatures. However, this may also vary in other embodiments.

Conversely, if it is determined in step 218 that the ESS temperature is greater than or equal to the third threshold value T3, then a determination is made as to whether the ESS temperature is less than a fourth threshold value T4 (step 222). In a preferred embodiment, the fourth threshold value T4 is dependent on the external temperature of the geographic area as determined in step 202. Specifically, in one preferred embodiment, the fourth threshold value T4 is dependent on the temperature environment of the geographic area as determined in step 204. For example, in one preferred embodiment, the fourth threshold value T4 is equal to 45 degrees Celsius if the temperature environment of the geographic area is determined to be a cold climate; 45 degrees Celsius if the temperature environment of the geographic area is determined to be a moderate climate; and 45 degrees Celsius if the temperature environment of the geographic area is determined to be a hot climate. However, these values, and/or the methods of assigning the fourth threshold value T4, may vary in other embodiments. In addition, in one preferred embodiment, the fourth threshold value T4 of step 222 is greater than each of the third threshold value T3 of step 218, the second threshold value T2 of step 214, and the first threshold value T1 of step 212 for any particular set of threshold values T1-T4, in other words, for any particular temperature environment for the geographic area surrounding the vehicle.

If it is determined in step 222 that the ESS temperature is less than the fourth threshold value T4, then an intermediate cooling of the energy storage system is performed (step 224). In one preferred embodiment, the intermediate cooling of the energy storage system 102 of FIG. 1 is facilitated by the processor 114 of the controller 106 of FIG. 1 by providing instructions to and operating the air conditioning unit 110 of FIG. 1 at a first power level. In one preferred embodiment, the power level is fifty percent. However, this may vary in other embodiments. Also in a preferred embodiment, if the energy storage system is plugged in to charge, then the energy storage system is charged at a rate corresponding to the target state of charge dependent upon the temperature during this time. In one preferred embodiment, the target state of charge is reduced by two percent for every one degree Celsius that the energy storage system exceeds the third threshold value T3, based on the accelerated calendar aging of batteries exposed to combined high temperature and high state of charge. However, this may also vary in other embodiments.

Conversely, if it is determined in step 222 that the ESS temperature is greater than or equal to the fourth threshold value T4, then maximum cooling is provided for the energy storage system (step 226). In one preferred embodiment, the maximum cooling of the energy storage system 102 of FIG. 1 is facilitated by the processor 114 of the controller 106 of FIG. 1 by providing instructions to and operating the air conditioning unit 110 of FIG. 1 at a second power level that is greater than the above-referenced first power level of step 224. In one preferred embodiment, the power level is one hundred percent until the ESS temperature is less than the fourth threshold value T4, at which point the power level for the air conditioning unit 110 of FIG. 1 is reduced to the above-referenced first power level (for example, at fifty percent capacity). However, this may vary in other embodiments. Also in a preferred embodiment, if the energy storage system is plugged in to charge, the energy storage system is not charged at this time, at least until the temperature is reduced below the fourth threshold value T4. However, this may also vary in other embodiments.

Accordingly, improved methods, program products, and systems are provided. The improved methods, program products, and system provide for improved conditioning of energy storage systems of hybrid and electric vehicles. The improved methods, program products, and systems provide for cooling, heating, and/or balancing of the temperatures of the energy storage system based upon the temperature environment of the geographic area surrounding the vehicle. By so doing, the improved methods, program products, and systems can help alleviate reductions in ESS power limits when the energy storage system is exposed to extreme cold temperatures or climates and/or that help alleviate the acceleration of calendar aging of the energy storage system when the energy storage system is exposed to extreme hot temperatures and/or climates, to thereby improve performance and/or life expectancy for the energy storage system.

It will be appreciated that the disclosed methods, program products, and systems may vary from those depicted in the Figures and described herein. For example, it will be appreciated that certain steps of the process 200 may vary from those depicted in FIGS. 2 and 3 and/or described herein in connection therewith. It will similarly be appreciated that certain steps of the process 200 may occur simultaneously or in a different order than that depicted in FIGS. 2 and 3 and/or described herein in connection therewith. It will similarly be appreciated that the disclosed methods, program products, and systems may be implemented and/or utilized in connection with any number of different types of automobiles, sedans, sport utility vehicles, trucks, and/or any of a number of other different types of vehicles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for conditioning an energy storage system for a vehicle located in a geographic area, the method comprising the steps of:
    generating outside air temperature signals relating to an outside air temperature of the geographic area via a first sensor;
    storing, via a memory, outside air temperature values for a plurality of ignition cycles of the vehicle based on the outside air temperature signals;
    generating signals relating to a temperature of the energy storage system via a second sensor; and
    via a processor coupled to the memory and the second sensor, facilitating:
        heating of the energy storage system if the temperature is less than a first predetermined threshold, the first predetermined threshold being dependent upon the outside air temperature values for the plurality of ignition cycles; and
        cooling of the energy storage system if the temperature is greater than a second predetermined threshold, the second predetermined threshold being dependent upon the outside air temperature values for the plurality of ignition cycles.

2. The method of claim 1, wherein the energy storage system comprises a plurality of modules each having a module temperature, and the method further comprises the step of:
    balancing the module temperatures via the processor if the temperature is greater than the first predetermined threshold and less than the second predetermined threshold.

3. The method of claim 1, wherein the step of facilitating cooling of the energy storage system comprises the steps of:
    cooling the energy storage system via the processor using a fan if the temperature is greater than the second predetermined threshold and less than a third predetermined threshold, the third predetermined threshold being dependent upon the outside air temperature values for the plurality of ignition cycles; and cooling the energy storage system via the processor using an air conditioning system if the temperature is greater than the third predetermined threshold.

4. The method of claim 3, wherein the step of cooling the energy storage system using the air conditioning system comprises the steps of:
   cooling the energy storage system via the processor using the air conditioning system at a first setting if the temperature is greater than the third predetermined threshold and less than a fourth predetermined threshold, the fourth predetermined threshold being dependent upon the outside air temperature values for the plurality of ignition cycles; and
   cooling the energy storage system via the processor using the air conditioning system at a second setting if the temperature is greater than the fourth predetermined threshold.

5. The method of claim 1, wherein the method further comprises the step of:
   selecting, via the processor, the first and second predetermined thresholds based on the outside air temperature values for the plurality of ignition cycles.

6. The method of claim 5, further comprising the steps of:
   selecting, via the processor, first values of the first and second predetermined thresholds if none of the outside air temperature values are greater than a first predetermined temperature value and at least one of the outside air temperature values is less than a second predetermined temperature value;
   selecting, via the processor, second values of the first and second predetermined thresholds if none of the outside air temperature values are less than the first predetermined temperature value and at least one of the outside air temperature values is greater than a third predetermined temperature value, the second values of the first and second predetermined thresholds being less than the first values of the first and second predetermined thresholds, respectively; and
   selecting, via the processor, third values of the first and second predetermined thresholds if the first values of the first and second predetermined thresholds are not selected and the second values of the first and second predetermined thresholds are not selected.

7. The method of claim 6, further comprising the steps of:
   selecting, via the processor, first values of the third and fourth predetermined thresholds if none of the outside air temperature values are greater than a first predetermined temperature value and at least one of the outside air temperature values is less than a second predetermined temperature value;
   selecting, via the processor, second values of the third and fourth predetermined thresholds if none of the outside air temperature values are less than the first predetermined temperature value and at least one of the outside air temperature values is greater than a third predetermined temperature value, the second values of the third and fourth predetermined thresholds being less than the first values of the third and fourth predetermined thresholds, respectively; and
   selecting, via the processor, third values of the third and fourth predetermined thresholds if the first values of the third and fourth predetermined thresholds are not selected and the second values of the third and fourth predetermined thresholds are not selected.

8. The method of claim 7, wherein:
the first predetermined temperature value is approximately fifteen degrees Celsius;
the second predetermined temperature value is approximately five degrees Celsius; and
the third predetermined temperature value is approximately twenty-five degrees Celsius.

9. A system for conditioning an energy storage system (ESS) for a vehicle located in a geographic area, the system comprising:
   a first sensor configured to generate outside air temperature signals related to an outside air temperature for the geographic area;
   a memory configured to store outside air temperature values for a plurality of ignition cycles of the vehicle based on the outside air temperature signals;
   a second sensor configured to generate ESS temperature signals related to an ESS temperature; and
   a processor coupled to the memory and the second sensor and configured to:
      facilitate heating of the energy storage system if the ESS temperature is less than a first predetermined threshold, the first predetermined threshold being dependent upon the outside air temperature values for the plurality of ignition cycles; and
      facilitate cooling of the energy storage system, if the ESS temperature is greater than a second predetermined threshold, the second predetermined threshold being dependent upon the outside air temperature values for the plurality of ignition cycles.

10. The system of claim 9, wherein the energy storage system comprises a plurality of modules each having a module temperature, and the processor is further configured to balance the module temperatures if the ESS temperature is greater than the first predetermined threshold and less than the second predetermined threshold.

11. The system of claim 9, wherein the processor is further configured to:
   facilitate cooling of the energy storage system using a fan if the ESS temperature is greater than the second predetermined threshold and less than a third predetermined threshold, the third predetermined threshold being dependent upon the outside air temperature; and
   facilitate cooling of the energy storage system using an air conditioning system if the ESS temperature is greater than the third predetermined threshold.

12. The system of claim 11, wherein the processor is further configured to:
   facilitate cooling of the energy storage system using the air conditioning system at a first setting, if the ESS temperature is greater than the third predetermined threshold and less than a fourth predetermined threshold, the fourth predetermined threshold being dependent upon the outside air temperature; and
   facilitate cooling of the energy storage system using the air conditioning system at a second setting, if the ESS temperature is greater than the fourth predetermined threshold.

13. The system of claim 9, wherein the processor is further configured to select the first predetermined threshold and the second predetermined threshold using the outside air temperature values for the plurality of ignition cycles.

14. The system of claim 11, wherein the processor is further configured to select the first predetermined threshold, the second predetermined threshold, and the third predetermined threshold using the outside air temperature values for the plurality of ignition cycles.

15. The system of claim 12, wherein the processor is further configured to select the first predetermined threshold, the second predetermined threshold, the third predetermined threshold, and the fourth predetermined threshold using the outside air temperature values for the plurality of ignition cycles.

16. The method of claim 3, further comprising:
selecting, via the processor, the first predetermined threshold, the second predetermined threshold, and the third predetermined threshold using the outside air temperature values for the plurality of ignition cycles.

17. The method of claim 4, further comprising:
selecting, via the processor, the first predetermined threshold, the second predetermined threshold, the third predetermined threshold, and the fourth predetermined threshold using the outside air temperature values for the plurality of ignition cycles.

* * * * *